(12) United States Patent  
Al-Buraik

(10) Patent No.: US 9,004,813 B2  
(45) Date of Patent: Apr. 14, 2015

(54) APPARATUS TO CONTAIN PIPELINE LEAKS FROM A LONGITUDINAL PORTION OF A PIPELINE

(71) Applicant: Saudi Arabian Oil Company, Dhahran (SA)

(72) Inventor: Khaled A. Al-Buraik, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 39 days.

(21) Appl. No.: 13/772,034

(22) Filed: Feb. 20, 2013

(65) Prior Publication Data

US 2013/0279988 A1   Oct. 24, 2013

Related U.S. Application Data

(60) Provisional application No. 61/600,782, filed on Feb. 20, 2012.

(51) Int. Cl.

| | |
|---|---|
| *E02B 15/04* | (2006.01) |
| *F17D 5/02* | (2006.01) |
| *E21B 43/01* | (2006.01) |
| *F16L 1/26* | (2006.01) |

(Continued)

(52) U.S. Cl.

CPC .............. *F17D 5/02* (2013.01); *E21B 43/0122* (2013.01); *E02B 15/04* (2013.01); *F16L 1/26* (2013.01); *F16L 41/002* (2013.01); *F16L 55/18* (2013.01)

(58) Field of Classification Search

CPC ... E21B 43/0122; E02B 15/00; E02B 15/046; E02B 15/04

USPC ...................... 405/60, 158, 184.1; 138/97, 99  
See application file for complete search history.

(56) References Cited

U.S. PATENT DOCUMENTS

| 3,480,043 A | 11/1969 | Proudfoot et al. | |
|---|---|---|---|
| 3,500,841 A * | 3/1970 | Logan | ............................. 405/60 |
| 3,653,215 A * | 4/1972 | Crucet | ............................. 405/60 |

(Continued)

FOREIGN PATENT DOCUMENTS

| EP | 1496297 A2 | 1/2005 |
|---|---|---|
| GB | 2033036 A | 5/1980 |

(Continued)

OTHER PUBLICATIONS

PCT Int'l Search Report and The Written Opinion dated Jun. 21, 2013; Int'l Application No. PCT/US2013/026855; Int'l Filing Date: Feb. 20, 2013.

*Primary Examiner* — Frederick L Lagman  
(74) *Attorney, Agent, or Firm* — Bracewell & Giuliani LLP; Constance Gall Rhebergen

(57) ABSTRACT

A containment apparatus can be used to contain fluids leaking through a tubular wall of the pipe from an interior of the pipe to an environment surrounding the pipe. The containment apparatus can include a fluid container that can be positioned on an exterior surface of the pipe. The containment apparatus includes a seal for sealingly engaging the diameter of the pipe. In embodiments, the seal can be inflated with a pressure media to form a tighter seal between the containment apparatus and the pipe. For subsea pipeline applications, the containment apparatus can include a riser extending to the surface of the sea, from which the leaking fluid can be collected. In embodiments, the containment apparatus can include a valve that can selectively permit leaking fluid to flow toward a collection receptacle.

15 Claims, 9 Drawing Sheets

(51) Int. Cl.
*F16L 41/00* (2006.01)
*F16L 55/18* (2006.01)

(56) References Cited

U.S. PATENT DOCUMENTS

| | | | |
|---|---|---|---|
| 3,827,448 A | | 8/1974 | Alba |
| 3,926,006 A | * | 12/1975 | Brooks et al. .............. 405/184.1 |
| 4,395,157 A | * | 7/1983 | Cunningham .................. 405/60 |
| 4,790,936 A | * | 12/1988 | Renfrow ........................ 405/68 |
| 5,113,912 A | | 5/1992 | Vetter |
| 5,511,573 A | * | 4/1996 | Corte ............................. 138/97 |
| 5,590,913 A | | 1/1997 | Morris et al. |
| 6,986,622 B2 | | 1/2006 | Ageheim et al. |
| 7,223,051 B1 | | 5/2007 | Vought et al. |
| 2010/0058967 A1 | * | 3/2010 | Baylot et al. ...................... 137/1 |
| 2011/0278019 A1 | * | 11/2011 | Davis ........................... 166/379 |
| 2011/0299929 A1 | * | 12/2011 | Sabourin ........................ 405/60 |
| 2012/0087729 A1 | * | 4/2012 | Oesterberg et al. ............ 405/60 |
| 2012/0155964 A1 | * | 6/2012 | Carter et al. .................... 405/60 |
| 2013/0259572 A1 | * | 10/2013 | Toedtman ....................... 405/60 |

FOREIGN PATENT DOCUMENTS

| | | |
|---|---|---|
| GB | 2396678 A | 6/2004 |
| WO | 95/11397 A1 | 4/1995 |

* cited by examiner

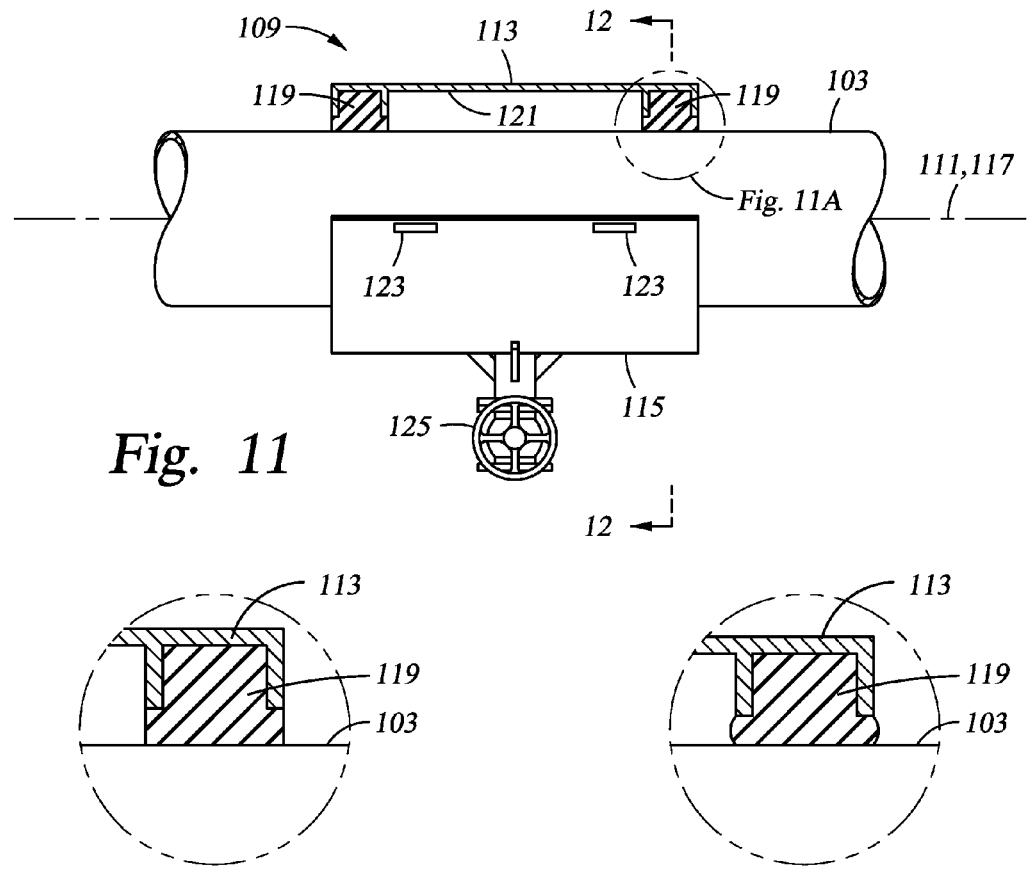
Fig. 11
Fig. 11A      Fig. 11B
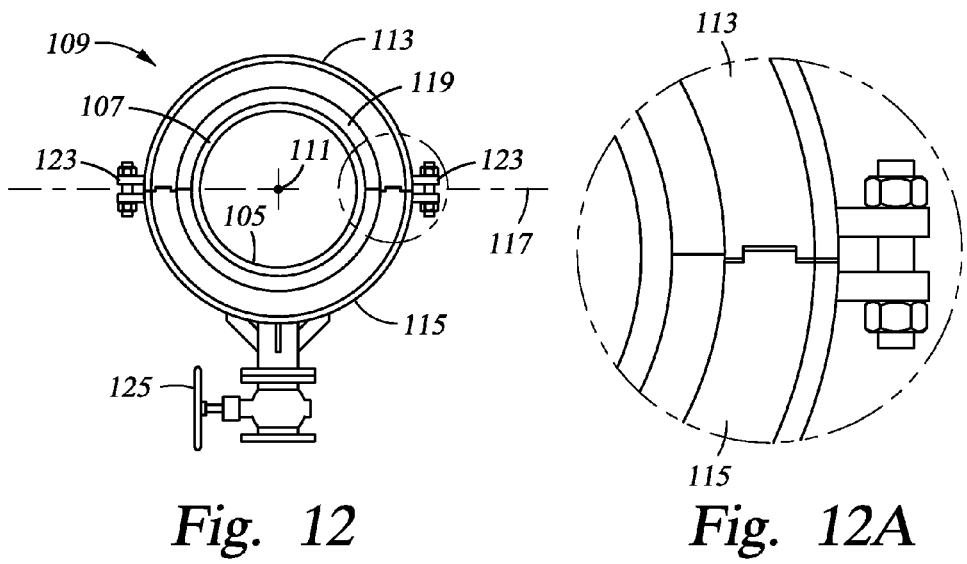
Fig. 12      Fig. 12A

APPARATUS TO CONTAIN PIPELINE LEAKS FROM A LONGITUDINAL PORTION OF A PIPELINE

CROSS-REFERENCE TO RELATED PATENT APPLICATIONS

This application claims priority to U.S. Provisional Patent Application No. 61/600,782 titled "Apparatus and Method to Contain Pipeline Leaks From a Longitudinal Portion of a Pipeline," filed on Feb. 20, 2012, the disclosure of which is incorporated herein by reference in its entirety.

BACKGROUND OF THE INVENTION

1. Field of the Invention

The present invention relates in general to pipelines and, in particular, to an apparatus and method to contain pipeline leaks.

2. Brief Description of Related Art

Following the Gulf of Mexico oil spill in 2010, a number of initiatives have been proposed and acted upon in order to provide a rapid response to contain oil spills, but these initiatives are focused on systems to shut down a leaking well. For example, a consortium is supporting development of a system that may eventually be able to contain wells in water up to 10,000 feet deep, with pressures of up to 15,000 pounds per square inch and collecting up to 100,000 barrels of oil and gas a day. An interim system is currently available that can accommodate 15,000-pound-per-square-inch wells in up to 8,000 feet of water and collecting up to 60,000 barrels a day. These initiatives, however, do not address the issue of pipeline leaks.

Wear and tear on oil and gas pipelines cannot be avoided, as corrosion and accidental damage can occur when least expected. In response to this, the South East Asia Pipeline Operators Group (SEAPOG) identified the Emergency Pipeline Repair Equipment Sharing (EPRES) initiative in April 2007. The EPRES provides a mechanism that mitigates risk and addresses the timely repair of pipelines. Shared services and spare equipment exchanges are common practice among pipeline operators. The basis of a mutual agreement where willing parties share their inventories is the key to addressing timely mitigation of pipeline emergencies and may provide an alternative route to developing a prototype of the proposed apparatus.

In terms of subsea pipeline leaks, emphasis is given to incorporation during design and construction phases of the necessary requirements to facilitate execution of future repairs, including material selection, welding, isolation, decontamination, repairs engineering (free spans, pipeline lifting), repairs contingency materials and procedures. As such, emergency pipeline repair equipment is generally accessible.

There are generally two different repair solutions depending on the size of the damage. When damage is minor, such as a dent that is small enough that a pipeline pig can still pass through the pipeline (a "piggable" dent), and pin-hole leaks, the damaged section does not need to be cut out. The repair includes cleaning the pipe surface in the vicinity of the leak and then installing a leak repair/reinforcement clamp around the damaged part. The factors for determining whether or not to cut out the damaged section of pipe include future operational piggability, operator pipeline integrity management ("PIM") policy, and operator pipeline repair philosophy.

For major damage, such as non-piggable dents or rupture, the damaged section must be cut out and replaced by a new section of pipe. This type of repair can include hot tapping, isolation, decommissioning and re-commissioning. Furthermore, a repair of this nature involves both subsea and on the surface activities, including a marine spread consisting of a Diving Support Vessel ("DSV"), diving spread, survey vessels and transportation barges, specialized pipeline preparations and repair equipment and pipeline connection equipment.

It is not always possible to immediately stop fluid flow and depressurize a pipeline to make a permanent repair. Therefore there is a need for a way to stop pipeline fluid from leaking into the surrounding environment until the pipeline can be shut down, depressurized, and permanently repaired.

SUMMARY OF THE INVENTION

These leak containment problems are generally solved or circumvented, and technical advantages are generally achieved, by embodiments of the present invention that provide an apparatus for in-place pipeline containment and a method to operate the same. Specifically, an apparatus and method for a fluid containment system is disclosed. Embodiments of the fluid containment system can contain fluid spills from a piping system resulting from a perforation of the piping system, such as a pinhole or rupture, caused by corrosion or external forces. Embodiments of the system can be used on pipes processing fluids such as hydrocarbon products, water or gases. The system can be used both onshore and offshore. Embodiments of the system can be manufactured in various sizes to suit the affected pipe, from, for example, 1" up to 72" in diameter. Embodiments of the system can be installed around defective pipe as a temporary repair to depressurize the piping system or for long-term isolation until the affected portion of the pipe is repaired or replaced.

Embodiments of the fluid containment system can contain leakage from submerged. tubular members, such as pipelines used for offshore installations, especially for leaks on the top half of the pipe (from 0900 to 0300 o'clock position). In such embodiments, a support pedestal is installed around the pipe and used to support and provide stability for the other components of the fluid containment system. The support pedestal can be manufactured from a variety of materials, including, for example, metals or high density polymers. The size of the pedestal is selected based on factors that include the size of the tubular member and the distance from the tubular member to the sea floor (or other surface above which the tubular member is located). Embodiments of the system also include an oil spill container, which can be a sheet-metal container with an open bottom and semi-circular recesses at each end. The size of the container, and the size of the recesses, are selected so that the arc of each recess generally conforms to the outer diameter arc of the tubular member, and the exterior surface of the tubular member forms at least a portion of the bottom of the container. The container can seal against the tubular member and, in embodiments, can seal against the pedestal. A sealing material, such as natural or synthetic rubber, or another suitable elastic material, is used to seal the area between the pedestal and the spill container, and between the pipe and the container, to ensure that the leakage is kept inside the container.

In embodiments, an inflatable type sealing system is designed and fitted inside the sealing edge surfaces of the spill container to ensure a tight sealing around the pipe body. The inflatable seal can be made from an elastic material such as rubber or synthetic elastomers and can be inflated by using a gas, such as, for example, air, nitrogen, or $CO_2$, or inflated with a hydraulic fluid. The inflatable seal can inflated by, for example, a service boat through a pneumatic or hydraulic connection (supply line) once the spill container is installed on top of the affected pipe.

Embodiments of the system also include a column which is used to transfer the collected fluid upward in order to be pumped out. The column can be cylindrical or square in shape and can be made from a sheet-metal such as carbon steel, stainless steel, copper or any suitable material. In order to suit various depths of the water depending of the location of the affected pipe, the column is made of multiple pieces of the same size that can be stacked on top of each other with a quick joining/release mechanism. On top of the column, a cone-shaped collecting compartment is installed above sea level to provide a space for collecting the leaking fluid and allowing for skimming by a suitable mechanical device (such as a skimming pump) to be sent to the service boat. The collecting compartment can be made from either metallic or non-metallic material.

Embodiments of a leak containment system can handle leakage from any location around the circumference of a tubular member, such as a subsea pipe. Such embodiments can be used for offshore applications to contain leakage from the affected tubular member and can be utilized for a long-term isolation until the tubular member is repaired or replaced. Embodiments do not include a supporting pedestal. Embodiments of the oil spill contain r include a stationary part and two or more hydraulically rotated parts (lower compartments) connected to the stationary part by a longitudinal hinge. The whole container can be towered on top of the affected tubular member by a crane from a service boat and, once reaching the required location, the hydraulic cylinders can be actuated from the service boat to rotate the movable parts around the tubular member. The hinges are of a sealing design so as to prevent any leakage through them. Cylinders utilized to rotate the movable parts can be pneumatically or hydraulically actuated. The inflatable sealing system goes around the pipe and is inflated by using, for example, a gas or hydraulic fluid. Another inflatable sealing system, which can be inflated by the same mechanism, is installed at the bottom of the movable parts to ensure a tight sealing with the affected pipe.

Embodiments of a leak containment system can be used for onshore applications to contain any leak from a tubular member, such as a piping system. It can be installed on pipes in horizontal or vertical orientation. Embodiments can include two sections that form a cylindrical compartment around the affected pipe when assembled. The cylindrical compartment can be made from sheet metal or high density polymers suitable for the pipe operating pressure. A sealing material made of rubber or any other elastic material is installed between the two sections to ensure tight sealing on the axial direction. A recess is fitted at both ends of the cylindrical compartment to host a half-circle inflatable sealing system. Once the two sections of the device are installed around the affected pipe and secured with a clamping device, the inflatable seals can be inflated by, for example, a gas or hydraulic fluid. There can be four inflatable seals, or more of fewer, depending on the configuration. When inflated, the seals will each press against the surface of the affected pipe to provide a tight sealing around the pipe and prevent any leakage outside the cylindrical compartment.

An isolation valve can be installed on one of the sections to vent or drain the collected leaking fluid when needed. For applications where the fluid inside the pipe is liquid, the isolation valve is in a lower portion of the compartment. For applications where the fluid inside the pipe is gas, the valve is in an upper portion of the compartment. External pipe or hose can be connected to the isolation valve to drain or vent the collected fluid to a safe location such as a collection receptacle.

In embodiments, the sealing system is not inflatable. The sealing material is made of elastic material such as rubber or elastomers. The sections forming the cylindrical shape around. the pipe can be manufactured in a size similar to the affected pipe. Once installed around the pipe, the sections will be pressed against the pipe circumference using the clamps and, thus, prevent leakage outside the compartment.

In embodiments having a column above the container, an isolation valve can be installed below the column. Such an isolation valve can isolate the leakage for an extended period of time and act as a pressure container until the affected pipe is repaired or replaced.

Embodiments of the fluid containment system provide a device to contain fluid spills from a pipeline that result from a pinhole or rupture in a tubular wall of the pipeline. The pinhole or rupture may be caused by corrosion or external forces. Embodiments of the system can be used on various types of tubular members, including pipes and tubing. For example, the system can be used on pipes processing fluids, such as hydrocarbon products, water, or gases. Furthermore, embodiments can be used both for onshore and offshore tubular members. Moreover, disclosed embodiments can be used on multiple pipeline diameter sizes, for example from a 1" diameter pipeline up to a 72" diameter pipeline. The disclosed embodiments provide a temporary repair allowing depressurization of the pipeline for repair, and a long-term isolation of the pipeline until the affected portion of the pipeline is repaired or replaced.

In embodiments, a containment apparatus is disposable around a pipe to contain substances passing through a tubular wall of the pipe from an interior of the pipe to an environment surrounding the pipe. The containment apparatus can include a fluid container having a portion disposable around at least a portion of an outer diameter surface of the pipe and extending a longitudinal distance along an axis of the pipe; one or more seal members mounted to edges of the fluid container so that when the fluid container is positioned on the pipe, the seal members seal the fluid container to an outer diameter surface of the pipe; and a sealing apparatus coupled to the fluid container and actuable to energize the seal members into sealing contact with the outer diameter surface of the pipeline.

In embodiments, the containment apparatus can further include one or more pedestals disposable closely adjacent to the pipe, the pedestals having a length extending along the axis of the pipe and a height extending from a surface on which the pipe is disposed and the fluid container can be disposable on the one or more pedestals so that the sealing members are closely co-planar with an imaginary plane bisecting the pipe. The fluid container can have openings formed in ends of the fluid container, the openings receiving a portion of the outer diameter surface of the pipe when the fluid container is disposed on the pedestals, the openings having a diameter substantially equal to the outer diameter of the pipe and a column can be mounted to the fluid container to provide fluid communication from the fluid container, the column extending away from the outer diameter surface of the pipe. In embodiments, the seal members extend along a longitudinal portion of the fluid container and along the openings so that the seal members are disposed to provide a fluid cavity sealingly isolated from an area outside of the fluid container and the sealing apparatus provides a pressure media to the seal members to inflate the seal members into sealing contact with the pipe.

In embodiments, the pipe can be positioned subsea and a riser couples to the column and extends above a surface of the sea to provide fluid communication between the fluid cavity and a collecting compartment, the collecting compartment being accessible from the sea surface. An isolation valve can be positioned in the riser to selectively allow fluid communication between the fluid cavity of the fluid container and the sea surface.

In embodiments, lower portions of the fluid container can be pivotably mounted to the fluid container so that the lower portions pivot along longitudinal edges parallel to the axis of the pipe, the lower portions including a bottom that extends from the lower portions to the outer diameter surface of the pipe when the lower portions are pivoted inward. The lower portions can be disposable on the surface on which the pipe is disposed and position the fluid container so that the fluid container surrounds the pipe. The fluid container can have openings formed in ends of the fluid container, the openings being adapted to receive a portion of the outer diameter surface of the pipe when the fluid container is disposed on the pedestals, the openings having a diameter substantially equal to the outer diameter of the pipe. A column can be mounted to the fluid container to provide fluid communication from the fluid container, the column extending away from the outer diameter surface of the pipe. The seal members can extend along a longitudinal portion of the bottoms of the lower portions of the fluid container and along the openings so that the seal members are disposed to provide a fluid cavity sealingly isolated from an area outside of the fluid container and the sealing apparatus can provide a pressure media to the seal members to inflate the seal members into sealing contact with the pipe.

In embodiments, the pipe is positioned subsea and a riser is connected to the column and extends above a surface of the sea to a fluid container, the riser providing fluid communication between a fluid cavity of the fluid container and the sea surface. In embodiments, the containment apparatus can include an isolation valve positioned in the riser to selectively allow fluid communication between the fluid cavity of the fluid container and the sea surface.

In embodiments, the fluid chamber further includes a cylindrical member separable into an upper portion and a lower portion along a longitudinal plane, the upper portion and the lower portion forming portions of a cylindrical cavity. The upper and lower portions can each include openings formed in each end so that the upper and lower portions may be disposed around the pipe and secured to each other, and at least a portion of the seal members are disposed around the openings to seal each end of the fluid chamber to the pipe. Embodiments can also include at least one clamping member mounted to the upper and lower portions so that when the upper and lower portions are secured to each other, the clamping member urges the seal members into sealing engagement with the pipe.

In embodiments, the sealing apparatus can provide a pressure media, such as pressurized hydraulic fluid or pressurized gas, to the seal members to inflate the seal members into sealing contact with the pipe. Embodiments can include an isolation valve mounted to at least one of the upper portion and the lower portion to selectively flow leaking fluid and gas from the tubular wall of the pipe toward the fluid chamber.

In embodiments, a containment apparatus is disposable around a pipe to contain substances passing through a tubular wall of the pipe from an interior of the pipe to an environment surrounding the pipe, and can include a fluid container having a portion disposable around at least a portion of an outer diameter surface of the pipe and extending a longitudinal distance along an axis of the pipe; one or more seal members positioned on one or more edges of the fluid container so that when the fluid container is positioned on the pipe, the seal members form a seal between the fluid container and the outer diameter surface of the pipe; and one or more pedestals disposable closely adjacent to the pipe, the pedestals having a length extending along the axis of the pipe and a height extending from a surface on which the pipe is disposed. The fluid container can be disposable on the one or more pedestals so that the sealing members are closely co-planar with an imaginary plane bisecting the pipe. The fluid container can have openings formed in ends of the fluid container, the openings adapted to receive a portion of the outer diameter surface of the pipe when the fluid container is disposed on the pedestals, the openings having a diameter substantially equal to the outer diameter of the pipe; and a column mounted to the fluid container to provide fluid communication from the fluid container, the column extending away from the outer diameter surface of the pipe. The seal members can extend along a longitudinal portion of the fluid container and along the openings so that the seal members are disposed to provide a fluid cavity sealingly isolated from an area outside of the fluid container.

In embodiments of a containment apparatus disposable around a pipe to contain substances passing through a tubular wall of the pipe from an interior of the pipe to an environment surrounding the pipe, the containment apparatus can include a fluid container having a portion disposable around at least a portion of an outer diameter surface of the pipe and extending a longitudinal distance along an axis of the pipe, the fluid container having an opposing ends and an opening formed in each end, the openings having a diameter substantially equal to the outer diameter of the pipe to receive a portion of the outer diameter surface of the pipe when the fluid container is disposed on the pipe; one or more seal members mounted to one or more edges of the fluid container so that when the fluid container is positioned on the pipe, the seal members seal the fluid container to the outer diameter surface of the pipe; a lower portion of the fluid container pivotably mounted to a side of the fluid container so that the lower portion may pivot along a longitudinal edge of the side parallel to the axis of the pipe, the lower portion including a bottom that extends from the lower portion to the outer diameter surface of the pipe when the lower portion is pivoted inward. In embodiments, the lower portion is disposable on the surface on which the pipe is disposed and positions the fluid container so that the fluid. container surrounds the pipe, a column can be mounted to the fluid container to provide fluid communication from the fluid container, the column extending away from the outer diameter surface of the pipe; and the seal members can extend along a longitudinal portion of the bottoms of the lower portions of the fluid container and along the openings so that the seal members are disposed to provide a fluid cavity sealingly isolated from an area outside of the fluid container.

Embodiments can also include a sealing apparatus coupled to the fluid container and actuable to energize the seal members into sealing contact with the outer diameter surface of the pipeline. In embodiments, the sealing apparatus provides a pressure media to the seal members to inflate the seal members into sealing contact with the pipe. In embodiments, the lower portion of the fluid container is one of a pair of lower portions of the fluid container, each pivotably mounted to a side of the fluid container.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

FIG. 11 is a partial sectional side elevation view of an alternative containment apparatus disposed around an onshore pipeline in accordance with an embodiment.

FIG. 11A is a detail view of a sealing portion of the containment apparatus of FIG. 11 in accordance with an embodiment.

FIG. 11B is a detail view of an alternative sealing portion of the containment apparatus of FIG. 11 in accordance with an embodiment.

FIG. 12 is a sectional view of the alternative containment apparatus disposed on an onshore pipeline taken along line 12-12 of FIG. 11 in accordance with an embodiment.

FIG. 12A is a detail view of a portion of the alternative containment apparatus of FIG. 12 illustrating locations of contact between portions of the containment apparatus in accordance with an embodiment.

DETAILED DESCRIPTION OF THE PREFERRED EMBODIMENT

The present invention will now be described more fully hereinafter with reference to the accompanying drawings which illustrate embodiments of the invention. This invention can, however, be embodied in many different forms and should not be construed as limited to the illustrated embodiments set forth herein. Rather, these embodiments are provided so that this disclosure will be thorough and complete, and will filly convey the scope of the invention to those skilled in the art. Like numbers refer to like elements throughout, and the prime notation, it used indicates similar elements in alternative embodiments or positions.

In the following discussion, numerous specific details are set forth to provide a thorough understanding of the present invention. However, it will be obvious to those skilled in the art that the present invention can be practiced without such specific details. Additionally, for the most part, details concerning pipeline construction, operation, use, and the like have been omitted inasmuch as such details are not considered necessary to obtain a complete understanding of the present invention, and are considered to be within the skills of persons skilled in the relevant art.

Figure 1:
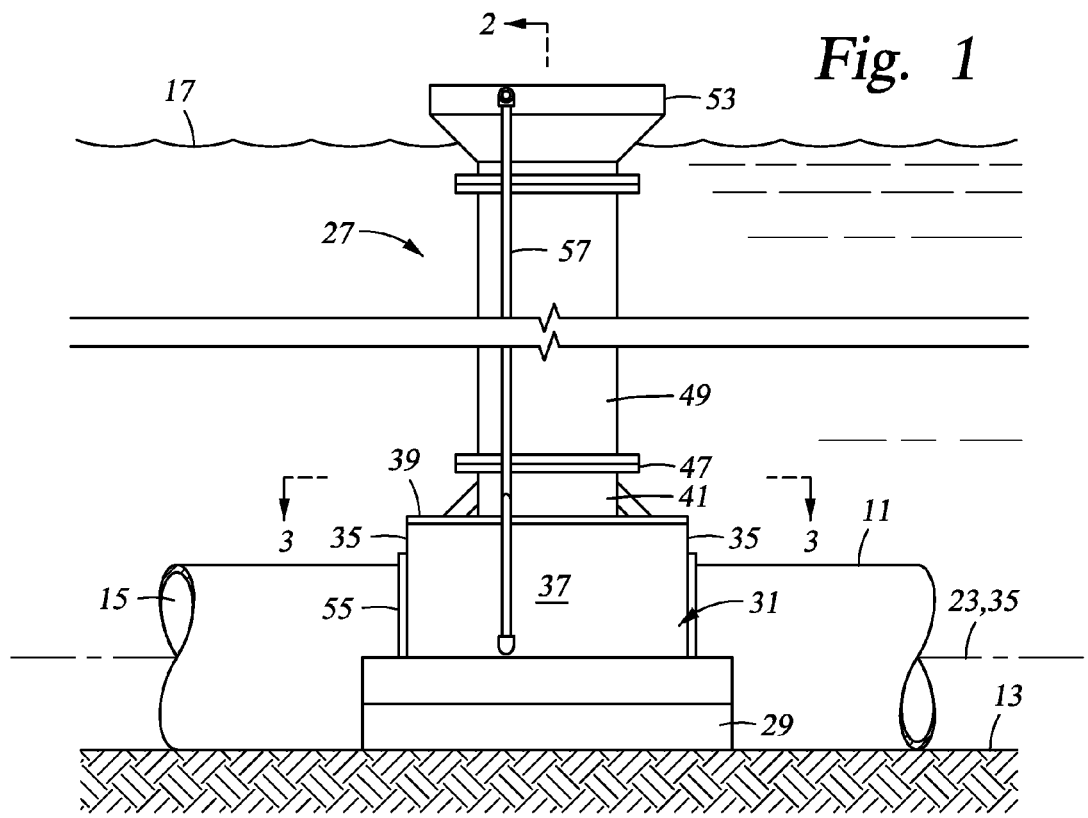
FIG. 1 is a side elevation view of a containment apparatus disposed on a subsea pipeline in accordance with an embodiment.

Referring to FIG. 1, a portion of a pipeline 11 is shown disposed on a sea floor 13. Pipeline 11 can be any suitable pipeline adapted to transport liquid and gaseous substances under pressure from one location to another location. Pipeline 11 can be a tubular member positioned directly on sea floor 13 as shown. Alternatively, pipeline 11 can be supported spaced-apart from sea floor 13. Pipeline 11 includes a bore 15 through which the liquid and gaseous substances can travel. Pipeline 11 can be made up of multiple components coupled together, only a portion of which is shown. Alternatively, pipeline 11 can be a continuous length of tubing. In the illustrated embodiment, pipeline 11 is disposed beneath a sea surface 17 so that fluid surrounds the portions of pipeline 11 not in contact with sea floor 13.

Figure 2:
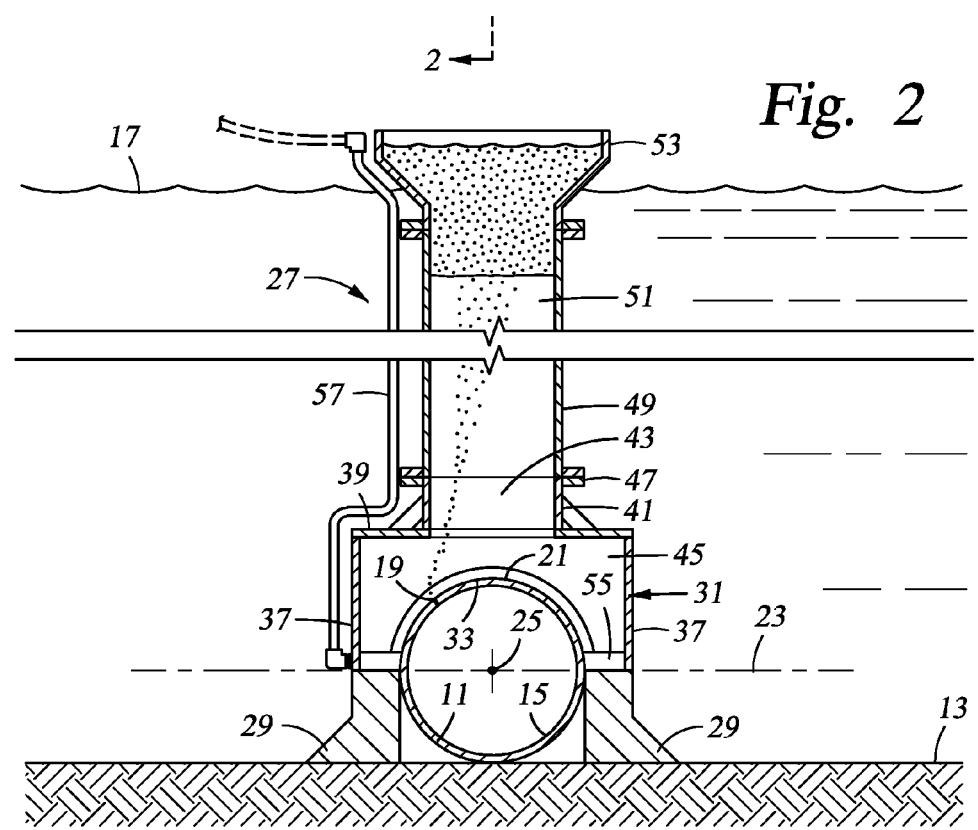
FIG. 2 is a sectional view of the containment apparatus disposed on a subsea pipeline taken along line 2-2 of FIG. 1 in accordance with an embodiment.

As shown in FIG. 2, pipeline 11 has a leak 19, such as a piggable dent, pinhole leak, or rupture. In the illustrated embodiment, leak 19 is located in an upper portion 21 of pipeline 11. Upper portion 21 is a portion of pipeline 11 extending above an imaginary plane 23 encompassing an axis 25 of pipeline 11. Imaginary plane 23 can bisect pipeline 11 and be generally parallel to sea floor 13. In an embodiment, imaginary plane 23 can be located halfway between a top point (zero degrees) and a bottom point (180 degrees) of pipeline 11. A person skilled in the art will recognize that sea floor 13 can include numerous topography changes; however, as discussed herein, sea floor 13 can generally be considered to extend horizontally.

Figure 3:
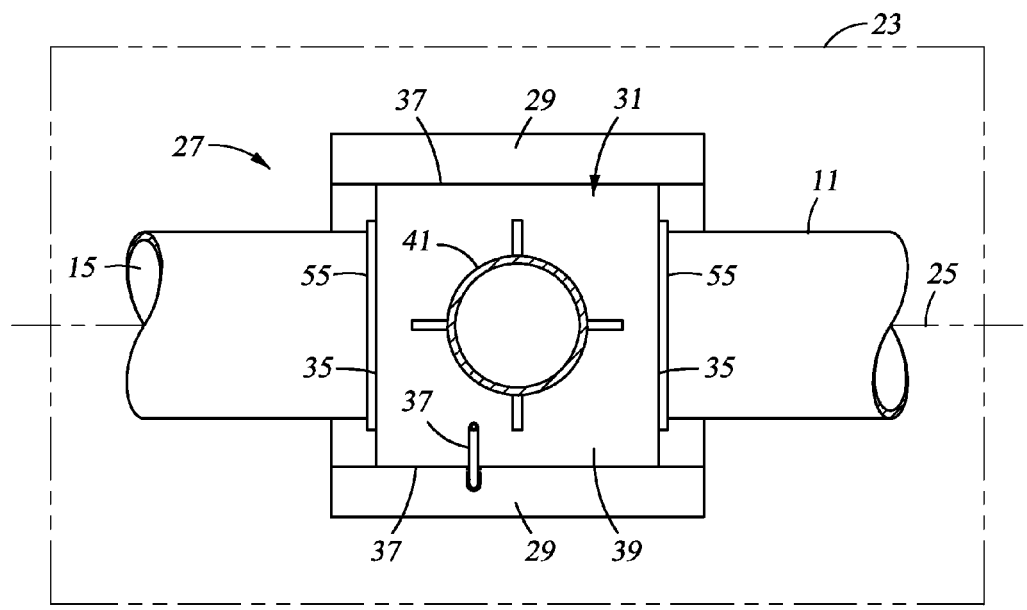
FIG. 3 is a top plan view of the containment apparatus disposed on a subsea pipeline of FIG. 1 in accordance with an embodiment.

As shown in FIGS. 1-3, a containment apparatus 27 is disposed around pipeline 11. Containment apparatus 27 includes one or more pedestals 29 positioned on sea floor 13, extending upward therefrom and longitudinally parallel to axis 25 of pipeline 11. Pedestals 29 are adapted to provide stability to containment apparatus 27 and can be manufactured from metals or other materials, such as high density polymers. A person skilled in the art will understand that pedestals 29 can have sufficient strength and durability to support containment apparatus 27 for prolonged periods of use in a subsea environment and can be exposed to extreme temperatures, extreme pressures, and corrosive elements. Pedestals 29 are adapted to fit closely adjacent to pipeline 11 and extend upward from sea floor 13 a sufficient amount to support containment device 27 at imaginary plane 23. A person skilled in the art will also understand that pedestals 29 can be any suitable size and shape provided pedestals 29 function as described herein.

Continuing to refer to FIGS. 1-3, containment apparatus 27 also includes an oil spill container 31. In an embodiment, oil spill container 31 is formed of metal sheets, or sheet metal, having semi-circular openings 33 at opposite ends 35. In an embodiment, openings 33 have a diameter substantially equivalent to an outer diameter of pipeline 11 so that upper portion 21 of pipeline 11 can pass through openings 33 as shown in FIG. 2. In the illustrated embodiment, oil spill container 31 can be a substantially cuboid object having opposing ends 35 into which openings 33 are formed and sides 37 joining opposing ends 35 at substantially perpendicular angles. A top 39 joins opposing ends 35 and sides 37 at substantially perpendicular angles and extends inward toward a medial portion of oil spill container 31. Ends 35, sides 37, and top 39 can be formed and joined in any suitable manner, for example by welding.

In the embodiment of FIG. 1-3, containment apparatus 27 further includes a tubular cylindrical column 41. Cylindrical column 41 joins top wall 39 near a center of top wall 39 so that a bore 43 of cylindrical column 39 is in fluid communication with an interior cavity 45 formed by top wall 39, sides 37, and ends 35. In the illustrated embodiment, cylindrical column 41 joins top wall 39, such as by welding the components together, so that cylindrical column 41 and top wall 39 are a single unit. A flange 47 is formed on an upper end of cylindrical column 41 so that a tubular riser 49 having a flange on a tower end can mount to cylindrical column 41 and extend upward proximate to sea surface 17. A person skilled in the art will recognize that riser 49 can include one or more members having a bore 51 coaxial with and substantially the same size as bore 43 of cylindrical column 41. An upper end of riser 49 has a flange formed or mounted thereon. A person skilled in the art will understand that cylindrical column flange 47, as well as flanges on riser 49 can be any suitable apparatus permitting coupling of riser 49 to cylindrical column 41. For example flange 47 can be a bolted flange, welded flange, quick connect fitting, or the like. A collecting compartment 53 mounts to the upper end of riser 49 at the flange. Collecting compartment 53 is a conical member having a wider end extending upward from the diameter of riser 43. The wider end of collecting compartment 53 will extend above sea surface 17. Collecting compartment 53 is open to the environment above sea surface 17 and in fluid communication with cavity 45 through bores 43, 51. When containment apparatus 27 is disposed as shown herein and energized as described in more detail below, fluids from leak 19 flow from an interior of pipeline 11 through leak 19 into cavity 45, where the fluid can flow to collecting compartment 53 for collection by a vessel, skimming pump, or the like. In an embodiment, containment compartment 53 includes a square shaped upper end that transitions to a conical portion connected to riser 49. Containment compartment 53, riser 49, and oil spill container 31 can be formed of carbon steel, stainless steel, copper, or any other suitable material provided the material has suitable properties permitting use in extreme temperature, extreme pressure, and corrosive subsea environments. In embodiments, riser 49 can be a flexible or semi-rigid hose extending from oil spill container 31 to containment compartment 53. In embodiments, containment compartment 53 can have sufficient buoyancy to float on the surface of the sea regardless of whether riser 49 is rigid.

Containment apparatus 27 also includes a seal apparatus 55. Seal apparatus 55 includes one or more seal members positioned at edges of containment apparatus 27 that are in close proximity to or contact pipeline 11 when containment apparatus 27 is disposed as shown in FIGS. 1-3. For example, lower edges of sides 37 opposite top 39 have one or more seat members positioned and/or mounted thereon. Similarly, lower edges of ends 35 opposite top 39 have one or more seal members positioned and/or mounted thereon. In addition, seal members can be mounted at edges of openings 33. In the illustrated embodiment, seal members of sealing apparatus 55 form a seating band at contact points with pipeline 11 so that upper portion 21 facing cavity 45 forms a lower portion of cavity 45 sealing cavity 45 from the surrounding subsea environment when containment apparatus 27 is disposed as shown in FIGS. 1-3. Seal apparatus 55 also seals to pedestals 29. Sealing apparatus 55 can be formed of synthetic rubber, another elastomeric material, or the like, provided that sealing apparatus 55 seals containment apparatus 27 to pipeline 11. In an embodiment, sealing apparatus 55 is an inflatable sealing apparatus. In these embodiments, sealing apparatus 55 is coupled to an inflation tine 57 (FIG. 2) by any suitable means. Inflation tine 57 extends from sealing apparatus 55 to a surface vessel (not shown) for supply of the inflating means. In an embodiment, the inflating means can be a pressure media, such as hydraulic fluid, gas, such as nitrogen, carbon dioxide, or the like, or any other suitable inflating means. Once containment apparatus 27 is positioned as shown, the vessel can manually or automatically supply the inflating means to inflation line 57. This causes sealing apparatus 55 to inflate, pressing sealing apparatus 55 into tighter contact with pipeline 11, thereby ensuring a seal preventing fluid communication between cavity 45 and the ambient sea environment. A person skilled in the art will understand that each seal member of seating apparatus 55 can be in communication with adjacent seal members so that each seal member can inflate in response to application of the inflating means. A person skilled in the art will understand that sealing apparatus 55 can be proximate to or closely adjacent pipeline 11 prior to inflation. In some embodiments, sealing apparatus 55 can seal to pipeline 11 prior to inflation. Following inflation sealing apparatus 55 provides a tighter seal along all surfaces or edges of cavity 45 proximate to pipeline 11.

Following disposal of containment apparatus 27 on pipeline 11 and inflation of sealing apparatus 55, fluid can flow from pipeline 11 into cavity 45 of containment apparatus 27. A person skilled in the art will understand that during placement of containment apparatus 27, the ambient fluid surrounding pipeline 11 can fill cavity 45, bore 43, and bore 51 up to sea surface 17. Generally, the fluid flowing through leak 19 has a density less than that of the fluid surrounding containment apparatus 27 so that the leaking fluid floats to sea surface 17 through cavity 45 and bores 43, 51. From sea surface 17 within containment compartment 53, the leaking fluid can be skimmed from the surface. In this manner, fluid leaking from upper portion 21 of pipeline 11 can be contained and collected. In addition, pipeline 11 can be depressurized following placement and sealing of containment apparatus 27 to limit or contain a larger oil spill and allow for permanent repair of pipeline 11. A person skilled in the art will recognize that depressurization of pipeline 11 can take significant time. In the illustrated embodiment, containment apparatus 27 can maintain leak 19 sealed within cavity 45 for the duration of depressurization of pipeline 11.

A person skilled in the art will understand that in some embodiments, a pressure build up can occur within cavity 45 due to the flow rate of the substance passing through leak 19.

Pressure can increase significantly and exert a force tending to push or remove containment apparatus 27 off of pedestals 29, breaking the seal formed by sealing apparatus 55. A person skilled in the art will recognize that in these embodiments, a suitable clamping mechanism can be used to secure containment apparatus 27 both to pedestals 29, and pipeline 11. For example, metal bands can be threaded around portions of containment apparatus 27 on opposite sides of cylinder column 41 that then wrap around pipeline 11, These bands can also wrap around pedestals 29.

Figure 4:
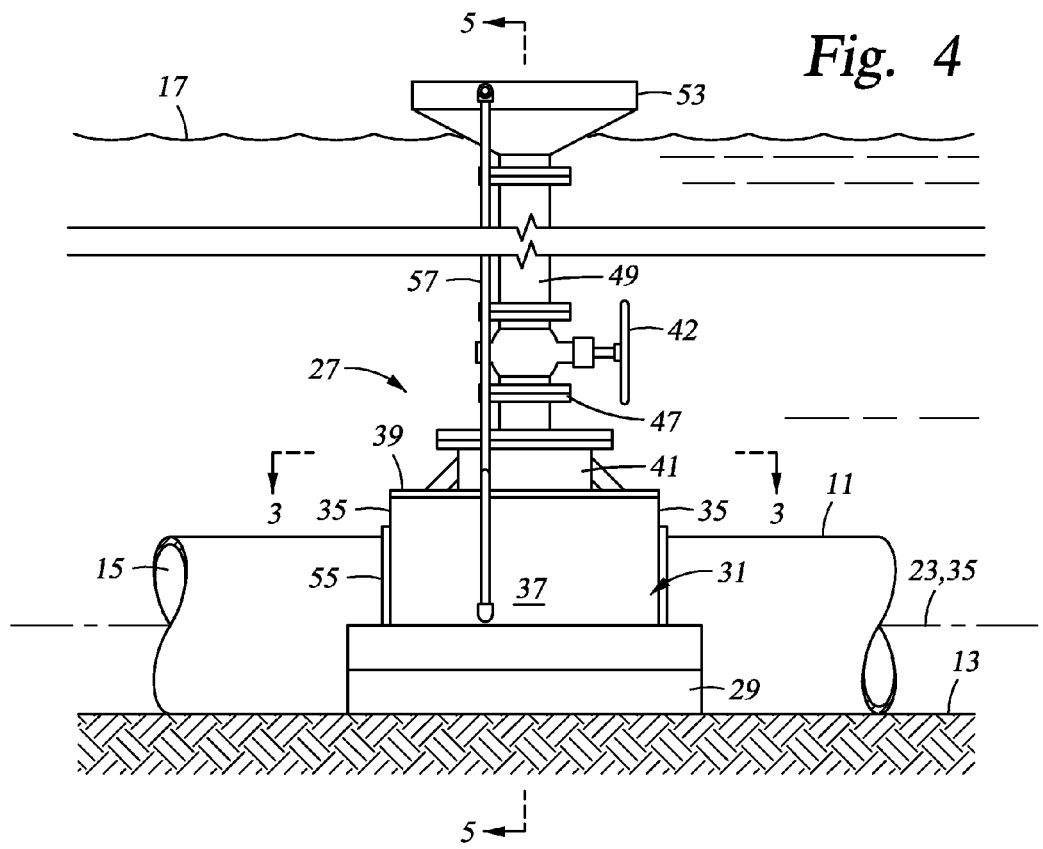
FIG. 4 is a side elevation view of the containment apparatus of FIG. 1 disposed on a subsea pipeline and having an isolation valve therein in accordance with an embodiment.
Figure 5:
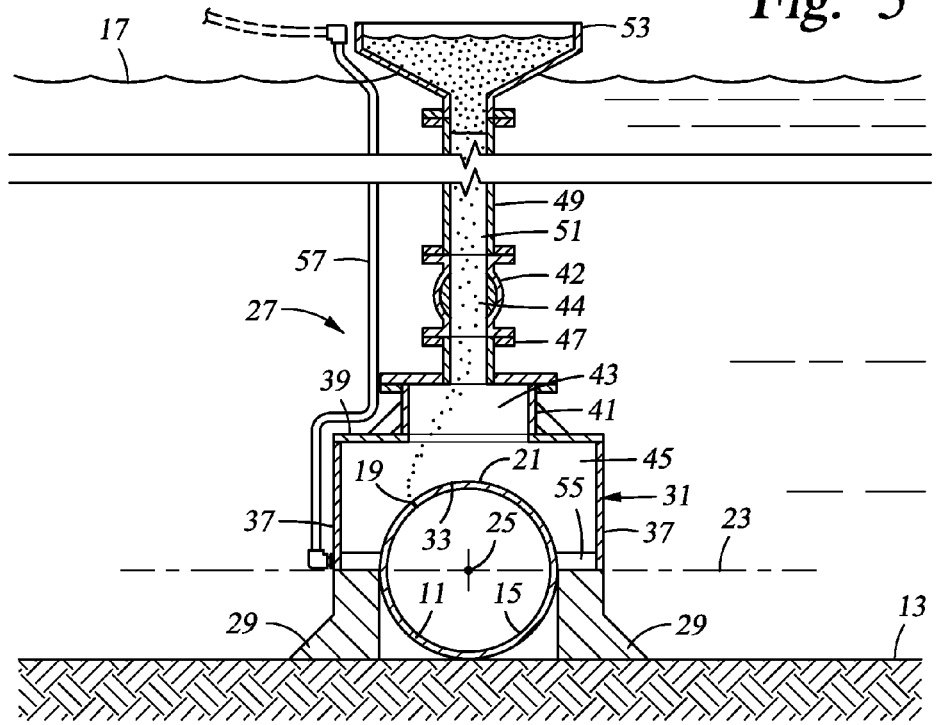
FIG. 5 is a sectional view of the containment apparatus disposed on a subsea pipeline taken along line 5-5 of FIG. 4 in accordance with an embodiment.

In an alternative embodiment, illustrated in FIGS. 4-5, an isolation valve 42 couples to cylindrical column 41. In the illustrated embodiment, isolation valve 42 has a central passage 44 having equivalent diameter as bore 43 of cylindrical column 41, although the diameter of central passage 44 can be different. An adapter couples to cylindrical column 41 to direct fluid flow from bore 43 of cylindrical column 41 to central passage 44 of isolation valve 42. As shown, bore 51 of riser 49 has a diameter of a similar size to isolation valve 42 so that fluid my flow into riser 49 from isolation valve 42 without further direction. Similarly, containment compartment 53 can be sized to couple to riser 49 as shown. Isolation valve 42 permits an operator of containment apparatus 27 to isolate the leakage for an extended period of time and prevent passage of leaked fluids from pipeline 11 out of containment apparatus 27. In some embodiments, a vacuum pump can be connected above isolation valve 42 to depressurize riser 49. Depressurization of riser 49 biases fluid flow from pipeline 11 through leak 19 into riser 49, This reduces the risk of further contamination of the surrounding environment by leak 19.

Figure 6:
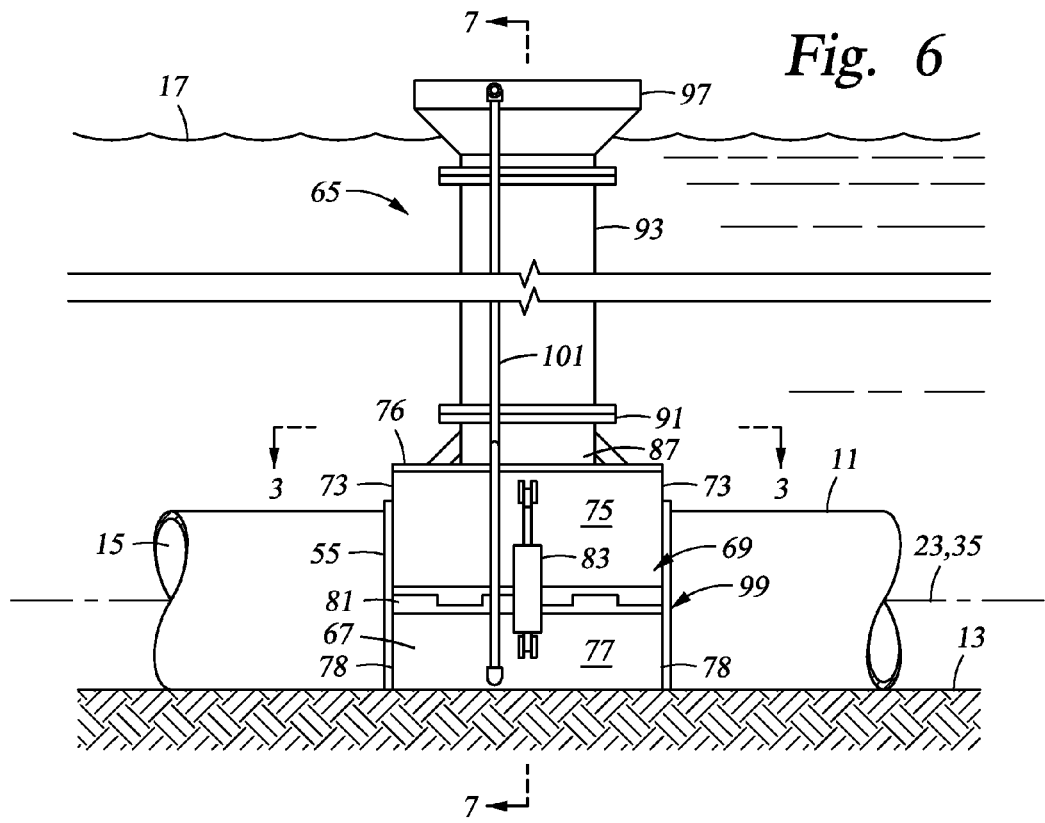
FIG. 6 is a side elevation view of an alternative containment apparatus disposed on a subsea pipeline in accordance with an embodiment.
Figure 7:
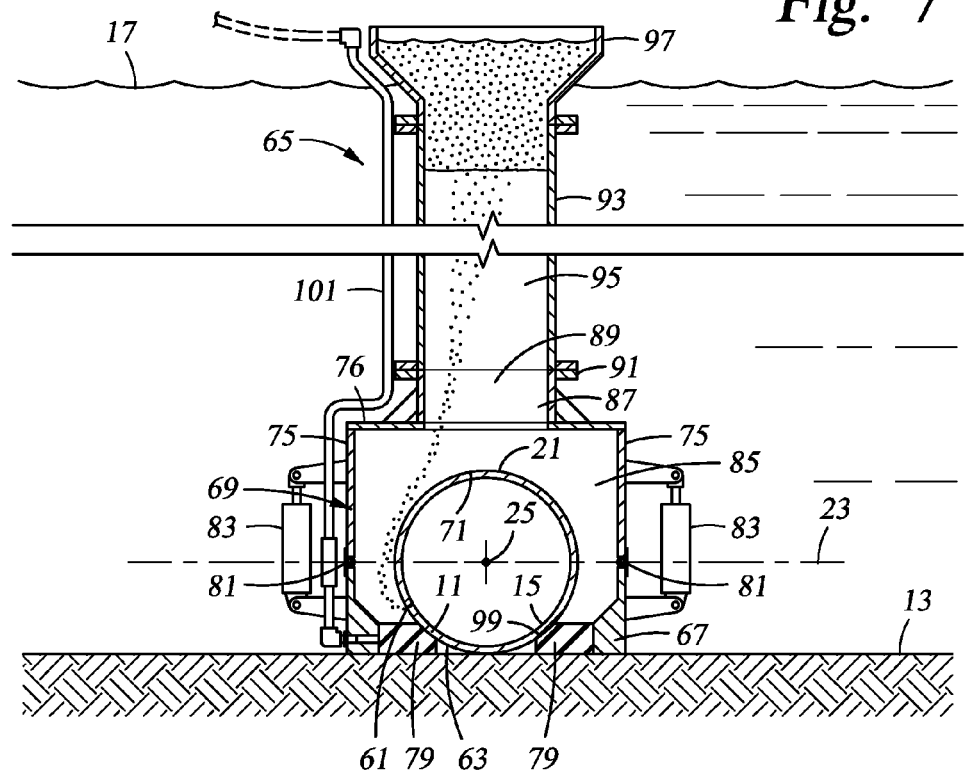
FIG. 7 is a sectional view of the alternative containment apparatus disposed on a subsea pipeline taken along line 7-7 of FIG. 6 in accordance with an embodiment.
Figure 8:
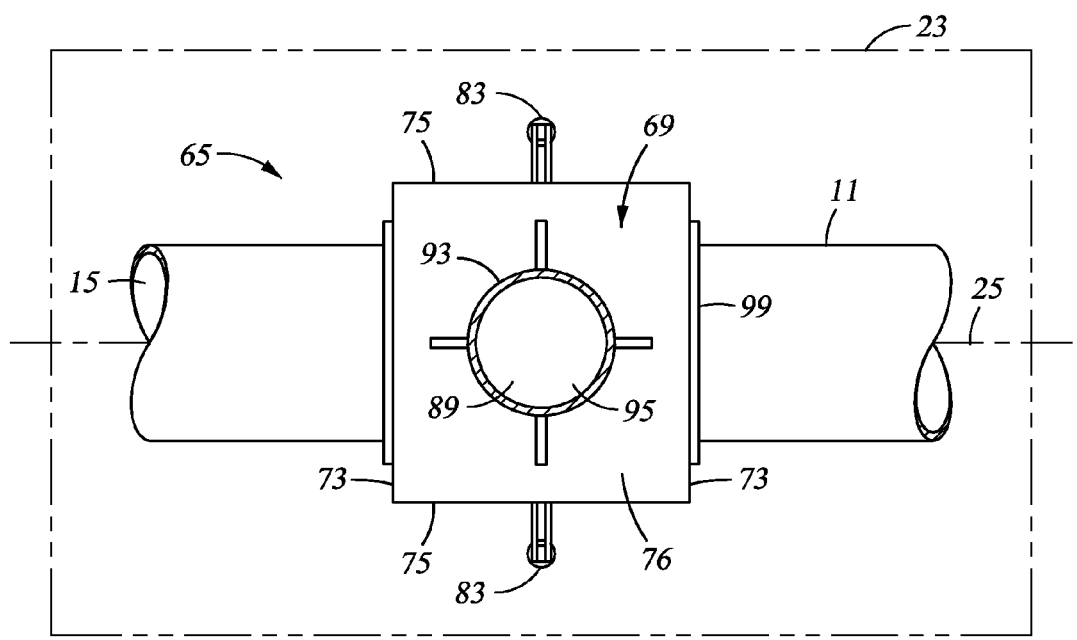
FIG. 8 is a top plan view of the alternative containment apparatus disposed on a subsea pipeline of FIG. 6 in accordance with an embodiment.

Referring to FIGS. 6-8, an alternative containment apparatus 65 is disposed around pipeline 11. Pipeline 11 of FIGS. 6-8 includes the components of pipeline 11 of FIGS. 1-3 discussed above. As shown in FIG. 7, pipeline 11 has a teak 61, such as a piggable dent, pinhole leak, or rupture. In the illustrated embodiment, leak 61 is located in a lower portion 63 of pipeline 11. Lower portion 63 is a portion of pipeline 11 depending below imaginary plane 23 encompassing axis 25 of pipeline 11. Imaginary plane 23 bisects pipeline 11 and is generally parallel to sea floor 13. A person skilled in the art will recognize that sea floor 13 can include numerous topography changes; however, as discussed herein, sea floor 13 can generally be considered to extend horizontally. Due to the position of leak 61 in tower portion 63 below plane 23, containment apparatus 27 of FIGS. 1-3 may be ineffective for containing leak 61.

In the illustrated embodiment, containment apparatus 65 is adapted to substantially surround pipeline 11. A person skilled in the art will understand that containment apparatus 65 may not surround portions of pipeline 11 in contact with sea floor 13. Containment apparatus 65 includes one or more longitudinally extending hinged portions 67 and an oil spill container 69. In an embodiment, oil spill container 69 is formed of metal sheets having semi-circular openings 71 at opposite ends 73. In an embodiment, openings 71 have a diameter substantially equivalent to an outer diameter of pipeline 11 so that upper portion 21 of pipeline 11 can pass through openings 71 as shown in FIG. 7. In the illustrated embodiment, oil spill container 69 can be a substantially cuboid object having opposing ends 73 into which openings 71 are formed and sides 75 joining opposing ends 73 at substantially perpendicular angles. A top 76 joins opposing ends 73 and sides 75 at substantially perpendicular angles and extends inward toward a medial of oil spill container 69. Ends 73, sides 75, and top 76 can be formed and joined in any suitable manner, for example by welding.

Hinged portions 67 are coupled to sides 75 by any suitable means, provided hinged portions 67 can pivot on a coupled longitudinal portion of hinged portions 67 proximate to and extending the length of sides 75. Hinged portions 67 include downward depending sides 77 and inwardly extending bottoms 79. Hinged portions 67 can pivot about hinge pivot 81 so that hinged portions 67 can move toward and away from pipeline 11 when containment apparatus 65 is disposed thereon as shown in FIGS. 6-8. Containment apparatus 65 is sealable at pivot 81 so that fluid communication can not occur through pivot 81, When disposed on pipeline 11 as shown in FIGS. 6-8, pivot 81 can be located half way between a bottom of pipeline 11 disposed proximate to sea floor 13 and a top of pipeline 11 opposite the bottom of pipeline 11. Bottoms 79 can be elastomeric elements similar to sealing apparatus 55 of FIG. 1-3 and described in more detail below. Hinged portions 67 include side elements 78 (FIG. 6) extending from sides 77 to pipeline 11 when disposed as shown in FIG. 7. Interior portions of side portions 78 will be formed to follow the outer diameter surface of pipeline 11 and include sealing members disposed thereon.

Figure 7A:
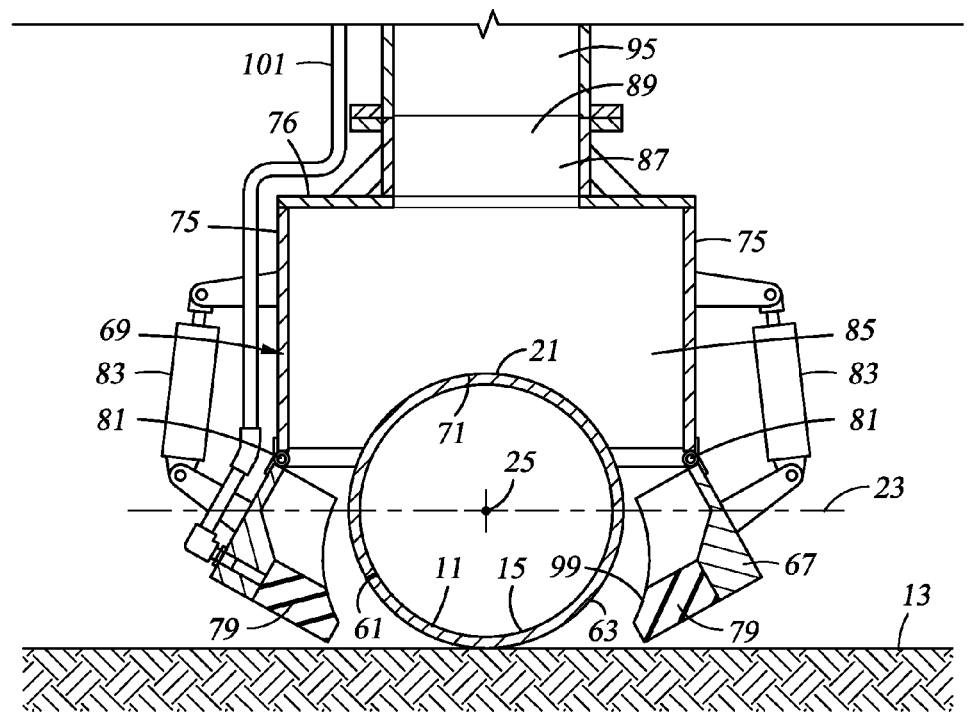
FIG. 7A is a schematic sectional view of the alternative containment apparatus of FIG. 7 shown in a running or (pre-containment position in accordance with an embodiment.

Hinged portions 67 also include an actuable cylinder 83 having a first end coupled to sides 75 and a second end coupled to hinged portion 67. A person skilled in the art will understand that cylinder 83 can be coupled to any suitable portion of containment apparatus 65 provided cylinder 83 operates as described below. Cylinder 83 can be supplied with hydraulic fluid pressure, gas pressure, or the like from a surface vessel (not shown), a supply apparatus carried by containment apparatus 65, or the like. In operation, cylinders 83 are actuable to exert a force on hinged portions 67 causing hinged portions 67 to pivot on pivot 81. During placement of containment apparatus 65 around pipeline 11, cylinders 83 actuate to pull hinged portions 67 away from a cavity 85 of containment apparatus 65 as shown in FIG. 7A. Once positioned around pipeline 11, cylinders 83 can again actuate to exert a force to move hinged portions 67 on pivot 81 to the position illustrated in FIG. 7, placing pipeline 11 inside of cavity 85.

In the embodiment of FIGS. 6-8, containment apparatus 65 further includes a tubular cylindrical column 87. Cylindrical column 87 joins top wall 76 near a center of top wall 76 so that a bore 89 of cylindrical column 76 is in fluid communication with interior cavity 85 formed by top wall 76, sides 75, and ends 73. In the illustrated embodiment, cylindrical column 87 joins top wall 76, such as through welding, so that cylindrical column 87 and top wall 76 can be a single unit. A flange 91 is formed on an upper end of cylindrical column 87 so that a tubular riser 93 having a flange on a lower end can mount to cylindrical column 87 and extend upward proximate to sea surface 17. A person skilled in the art will recognize that riser 93 can include one or more members having a bore 95 coaxial with and substantially the same size as bore 89 of cylindrical column 87. An upper end of riser 93 has a flange formed or mounted thereon. A person skilled in the art will understand that cylindrical column flange 87, as well as flanges on riser 93 can be any suitable apparatus permitting the coupling of riser 93 to cylindrical column 87. For example, flange 87 and riser flanges can be bolted flanges, welded flanges, quick connect fittings, or the like. A collecting compartment 97 mounts to the upper end of riser 93 at the flange. Collecting compartment 97 is a conical member having a wider end extending upward from the diameter of riser 87. The wider end of collecting compartment 97 will extend above sea surface 17. Collecting compartment 97 is open to the environment above sea surface 17 and in fluid communication with cavity 85 through bores 89, 95. When containment apparatus 65 is disposed as shown herein and energized as described in more detail below, fluids from leak 61 flow from an interior of pipeline 11 through teak 61 into cavity 85, where the fluid can flow to collecting compartment 97 for collection by a vessel, skimming pump, or the like. In an embodiment, containment compartment 97 includes a square shaped upper end that transitions to a conical portion connected to riser 93. Containment compartment 97, riser 93, and oil spill container 69 can be formed of carbon steel, stainless steel, copper, or any other suitable material, provided the material has suitable resistance to extreme temperatures, extreme pressures, and corrosive subsea environments. In embodiments, riser 93 can be a flexible or semi-rigid hose extending from oil spill container 69 to containment compartment 97. In embodiments, containment compartment 97 can have sufficient buoyancy to float on the surface of the sea regardless of whether riser 93 is rigid.

Figure 7B:
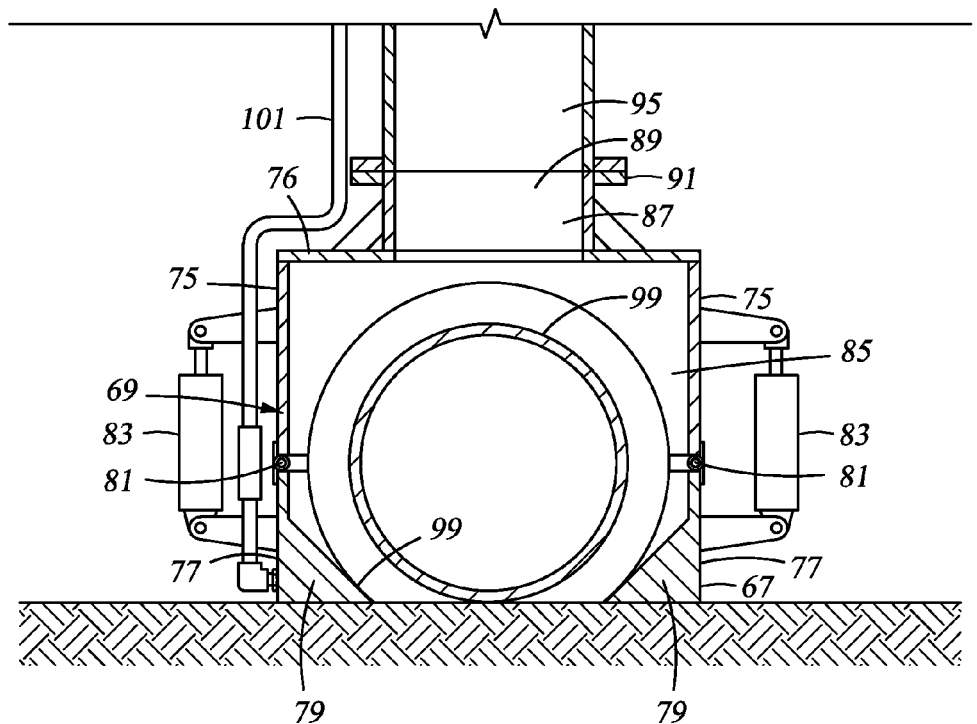
FIG. 7B is a schematic sectional view of the alternative containment apparatus of FIG. 7 shown with a sealing apparatus inflated and sealed to the pipeline in accordance with an embodiment.

Containment apparatus 65 also includes a seal apparatus 99. Seal apparatus 99 includes one or more seal members positioned at edges of containment apparatus 65 that are in close proximity to or contact pipeline 11 when containment apparatus 65 is disposed as shown in FIGS. 6-8. For example, bottoms 79 of hinged portions 67 can have seal members mounted thereon and adapted to extend between bottoms 79 and the outer diameter surface of pipeline 11 when containment apparatus 65 is disposed on pipeline lit as shown in FIG. 7. Similarly, the interior portions of side portions 78 adapted to be disposed proximate to the outer diameter of pipeline 11 and the edges of openings 71 can include seal members positioned thereon. In the illustrated embodiment, seal members of sealing apparatus 99 form a sealing band at contact points with pipeline 11 when energized. In this manner, cavity 85 can seal a portion of the outer diameter surface of pipeline 11 from the surrounding subsea environment. In the illustrated embodiment, sealing apparatus 99 seals leak 61 from the surrounding subsea environment when disposed as shown in FIGS. 6-8. Sealing apparatus 99 can be formed of synthetic rubber, another elastomeric material, or the like, provided that sealing apparatus 99 provides at least a generally fluid-tight seal between containment apparatus 65 and pipeline 11. In an embodiment, sealing apparatus 99 is an inflatable sealing apparatus. In these embodiments, sealing apparatus 99 is coupled to an inflation line 101 by any suitable means. Inflation line 101 extends from sealing apparatus 99 to a surface vessel (not shown) for supply of the inflating means. In an embodiment, the inflating means can be hydraulic fluid, gas, such as nitrogen, carbon dioxide, or the like, or any other suitable inflating means. Once containment apparatus 65 is positioned as shown in FIG. 7, the vessel can manually or automatically supply the inflating means to inflation line 101. This causes sealing apparatus 99 to inflate, pressing sealing apparatus 99 into tighter contact with pipeline 11, thereby ensuring a seal preventing fluid communication between cavity 85 and the ambient sea environment. A person skilled in the art will understand that seal members of sealing apparatus 99 can be in communication with adjacent seal members so that each inflates in response to application of the inflating means. A person skilled in the art will understand that sealing apparatus 99 can be proximate to or closely adjacent pipeline Ill prior to inflation. In some embodiments, sealing apparatus 99 can seal to pipeline 11 prior to inflation. Following inflation sealing apparatus 99 provides a tighter seal along all surfaces or edges of cavity 85 proximate to pipeline 11 as shown in FIG. 7B.

Following disposal containment apparatus 65 on pipeline 11 and inflation of sealing apparatus 99, fluid can flow from pipeline 11 into cavity 85 of containment apparatus 65. A person skilled in the art will understand that during placement of containment apparatus 65, the ambient fluid surrounding pipeline 11 can fill cavity 85, bore 89, and bore 95 up to sea surface 17. Generally, the fluid flowing through leak 61 has a density less than that of the fluid surrounding containment apparatus 65 so that the leaking fluid floats to sea surface 17 through cavity 85 and bores 89, 95. From sea surface 17 within containment compartment 97, the leaking fluid can be skimmed from the surface. In this manner, fluid leaking form lower portion 63 of pipeline 11 can be contained and collected. In addition, pipeline 11 can be depressurized following placement and sealing of containment apparatus 65 to limit or contain a larger oil spill and allow for permanent repair of pipeline 11. A person skilled in the art will understand that containment apparatus 65 can also be used to contain a leak similar to leak 19 of FIGS. 1-3.

Figure 9:
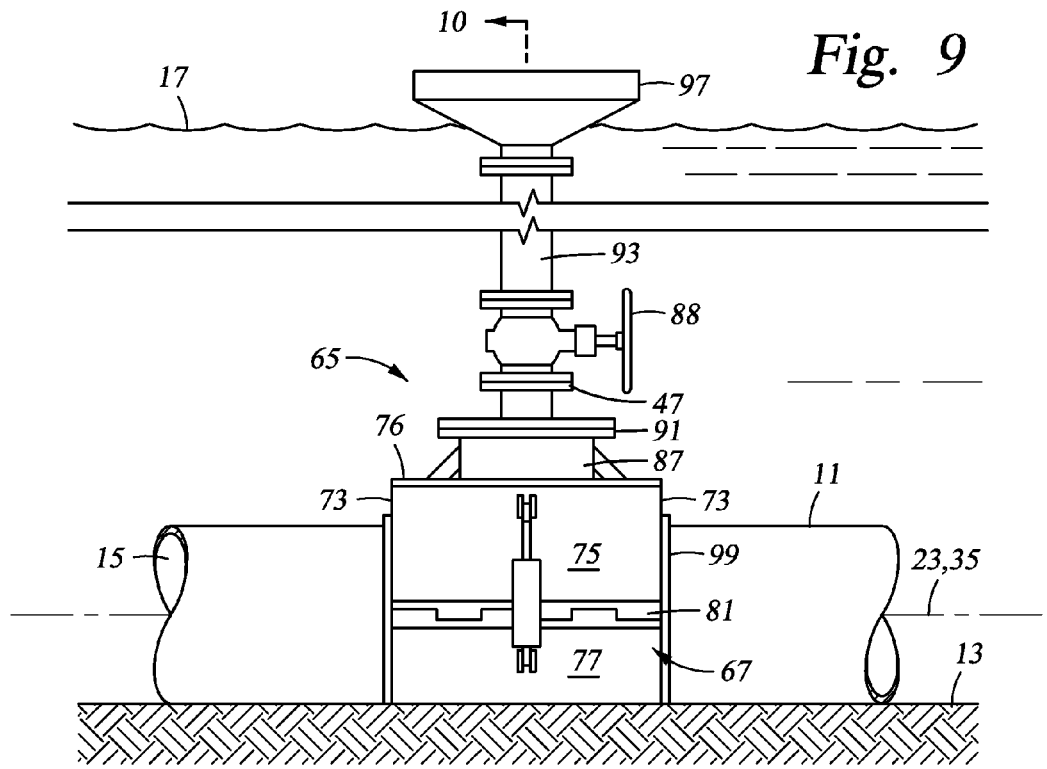
FIG. 9 is a side elevation view of the containment apparatus of FIG. 6 disposed on a subsea pipeline and having an isolation valve therein in accordance with an embodiment.
Figure 10:
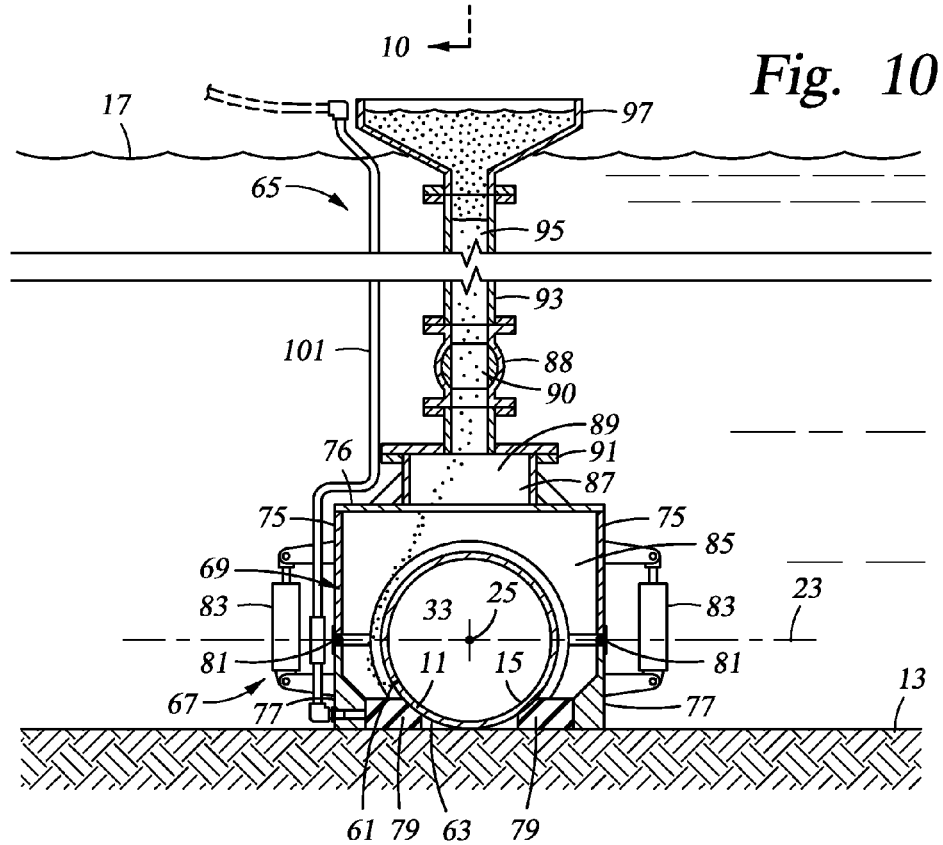
FIG. 10 is a sectional view of the containment apparatus disposed on a subsea pipeline taken along line 10-10 of FIG. 9 in accordance with an embodiment of the present invention.

In an alternative embodiment, illustrated in FIGS. 9-10, an isolation valve 88 couples to cylindrical column 87. In the illustrated embodiment, isolation valve 88 has a central passage 90. The diameter of central passage 90 is not necessarily have the same diameter as bore 89 of cylindrical column 87. An adapter couples to cylindrical column 87 to direct fluid flow from bore 89 of cylindrical column 87 to central passage 90 of isolation valve 88. As shown, bore 95 of riser 93 has a diameter of a similar size to isolation valve 88 so that fluid my flow into riser 93 from isolation valve 88 without further direction. Similarly, containment compartment 97 can be sized to couple to riser 93 as shown. Isolation valve 88 permits an operator of containment apparatus 65 to isolate the leakage for an extended period of time and prevent passage of leaked fluids from pipeline 11 out of containment apparatus 65. In some embodiments, a vacuum pump can be connected above isolation valve 88 to depressurize riser 93. Depressurization of riser 93 biases fluid flow from pipeline 11 through leak 61 into riser 93. This reduces the risk of further contamination of the surrounding environment by leak 61.

Figure 13:
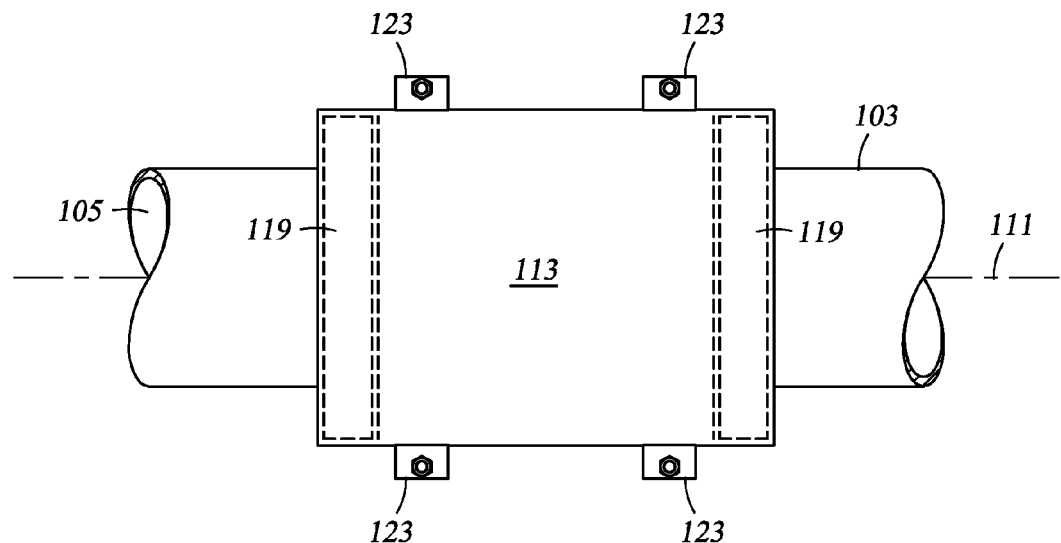
FIG. 13 is top plan view of the alternative containment apparatus of FIG. 11 in accordance with an embodiment.

In another alternative embodiment, illustrated in FIGS. 11-13, a portion of a pipeline 103 is shown. Pipeline 103 is shown in an onshore location. Pipeline 103 can be installed above or below an onshore surface. Pipeline 103 can be any suitable pipeline adapted to transport liquid and gaseous substances under pressure from one location to another location. Pipeline 103 includes a bore 105 through which the liquid and gaseous substances can travel and can be made up of multiple components coupled together, a portion of which is shown.

As shown in FIG. 12, pipeline 103 has a leak 107, such as a piggable dent, pinhole leak, or rupture. A cylindrical containment apparatus 109 circumscribes pipeline 103 so that containment apparatus 109 is coaxial with an axis 111 of pipeline 103. In the illustrated embodiment, containment apparatus 109 comprises an upper portion 113 and a tower portion 115. In the illustrated embodiment, upper portion 113 and lower portion 115 can be equally sized portions of containment apparatus 109 bisected by a substantially horizontal imaginary plane 117 encompassing axis 111. Upper portion 113 and lower portion 115 include one or more seal members 119 mounted to opposite ends of each portion 113, 115. In the illustrated embodiment, four seal members 119 are used, a separate seal member 119 positioned at each end of upper portion 113 and a separate seal member 119 positioned at each end of tower portion 115. In the illustrated embodiment, seal members 119 can be formed of rubber or any other suitable elastomer type material. Upper portion 113 and lower portion 115 form two halves of a cylindrical cavity 121 through which pipeline 103 can pass as shown in FIG. 11 and FIG. 13. Upper portion 113 and tower portion 115 include clamps 123 formed on longitudinal edges of upper portion 113 and lower portion 115. In the illustrated embodiments, clamps 123 can be flanges having bores formed therein. Bolts can be threaded through clamps 123 and secured with an associated nut to secure upper portion 113 to lower portion 115. A person skilled in the art will understand that any suitable clamping mechanism can be used provided the clamping mechanism secures upper portion 113 to lower portion 115 and exerts a force causing upper portion 113 and lower portion 115 to seal a portion of the outer diameter surface of pipeline 103 at leak 107 from the surrounding environment.

As shown, containment apparatus 109 can be placed around leak 107 in the following manner. Containment apparatus 109 will be separated into upper portion 113 and lower portion 115. Lower portion 115 and upper portion 113 can be placed around pipeline 103 so that leak 107 is positioned between seal members 119. Clamps 123 of upper portion 113 and lower portion 115 are aligned and clamps 123 of upper portion 113 are secured to clamps 123 of tower portion 115. In the embodiment of FIG. 11A, clamping force is applied to clamps 123 so that seal members 119 can be compressed between upper and lower portions 113, 115 and an outer diameter of pipeline 103. In the embodiment of FIG. 11B, seal members 119 are inflatable members that can be coupled with hydraulic or pneumatic pressure to expand seal members 119 similar to seal apparatuses 55, 99 of FIGS. 1-3 and 6-8, respectively. An initial seal can be formed between seal members 119 and pipeline 103 through compression by clamps 123 as in FIG. 11A. As shown in FIG. 11B, seal members 119 can be inflated to form a tighter seal between upper portion 113 and the outer diameter surface of pipeline 103. In this manner, fluids or gases leaking from pipeline 103 through leak 107 can be trapped in cylindrical cavity 121 of containment apparatus 109. A person skilled in the art will understand that embodiments include both inflating and non-inflating seal members 119.

In some embodiments, an isolation valve 125 can be secured to one or more of upper potion 113 and lower portion 115 (shown in FIGS. 11-12). Isolation valve 125 provides for fluid or gas removal from cylindrical cavity 121 without requiring removal of containment apparatus 109 from pipeline 103.

As shown in FIG. 12A, upper portion 113 and lower portion 115 can be keyed to ensure proper alignment of upper portion 113 and lower portion 115 for containment of fluids or gases leaking form leak 107.

Figure 14:
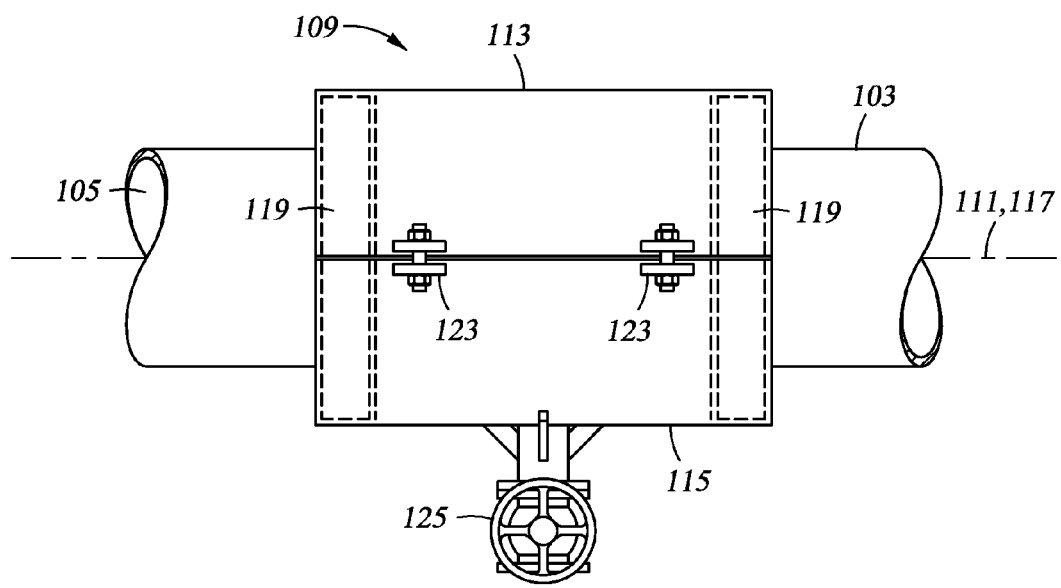
FIG. 14 is a side elevation view of the alternative containment apparatus of FIG. 11 dispose around a vertical onshore pipeline in accordance with an embodiment.

Referring to FIG. 14, containment apparatus 109 can be installed on a vertical v extending pipeline 103 as shown.

Figure 15:
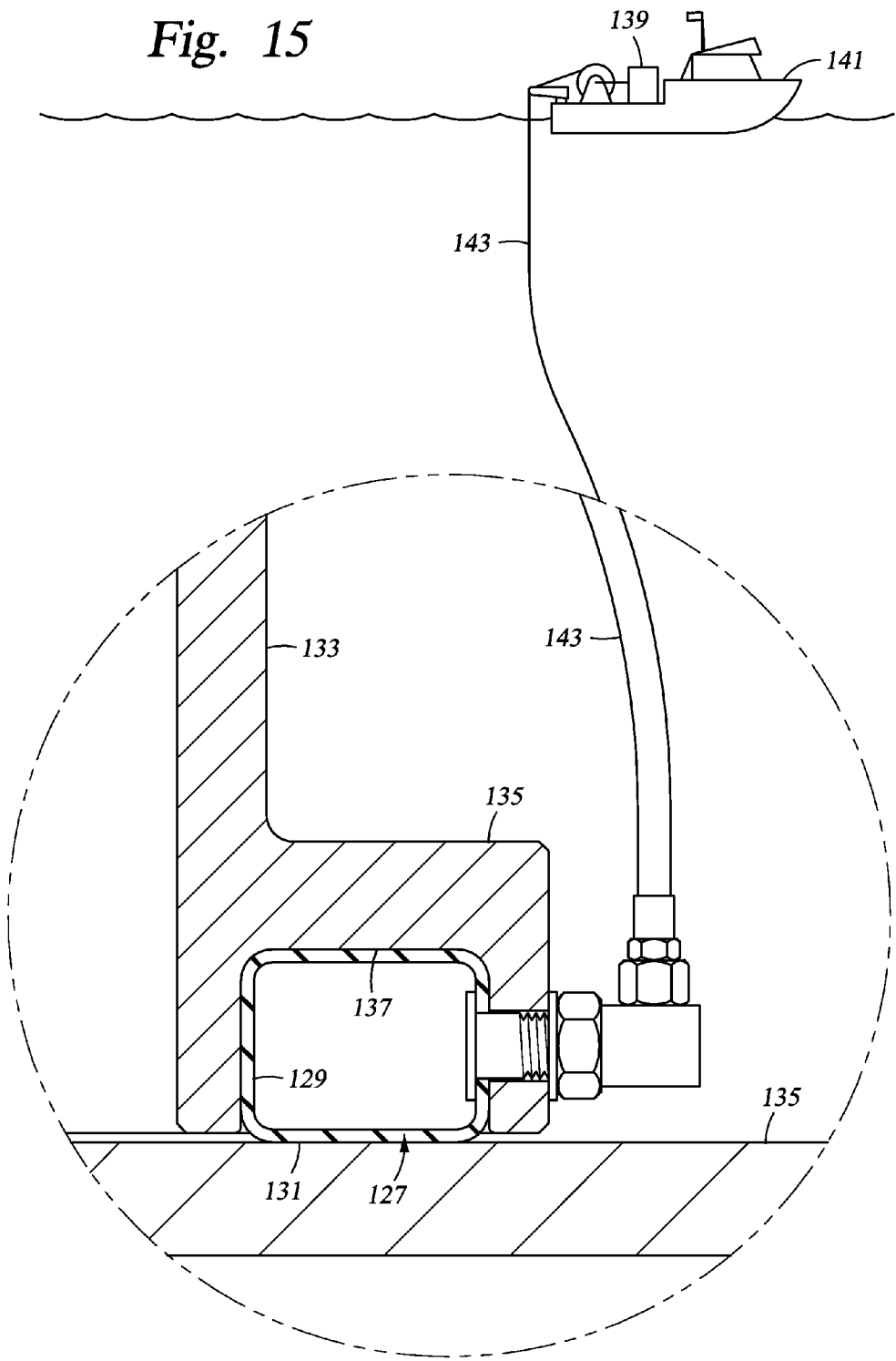
FIG. 15 is a side elevation view of an embodiment of the invention including an inflatable seal.

Various embodiments described herein can include an inflatable seating means. FIG. 15 illustrates an embodiment of an inflatable seal. Seal 127 is an elastomeric seal having a chamber defined by inner sidewall 129 and an outer seating surface 131. Pressure media is introduced into the chamber and urges sidewall 129, and thus outer sealing surface 131, outward. The illustration of the seal is shown in the context of side 133, which is a side of a container such as container 31 (FIGS. 1-3), but seal 127 can represent any of the inflatable seals described herein. Seal 127 creates a seal between side 133 and an adjacent member 135. The adjacent member 135 can be for example, a pipe, a pedestal, an extending bottom, or any of the components described herein as having an inflatable seal.

Seal 127 can be connected to side 133 before side 133 is placed on adjacent member 135. One of ordinary skill in the art will appreciate that seal 127 can be held in place by a variety of techniques including, for example, an adhesive or by being press fit into a channel so that it remains in place until side 133 is proximate adjacent member 135. In the embodiment shown in FIG. 15, side 133 includes a flange 135 extending therefrom. Flange 135 can have a seal recess 137 for receiving at least a portion of seal 127. If side 133 is sufficiently thick, seal 127 can be connected to an end face of side 133.

A pressure media can be used to inflate seal 127. The pressure media can be, for example, a liquid such as hydraulic fluid or water, or a gas such as compressed air, nitrogen, or $CO_2$. Other types of pressure media can be used. Inflator 139 can be used to pressurize the pressure media and, thus, inflate seal 127. Inflator 139 can be a compressor, a hydraulic pump, or a pressurized storage device such as a gas cylinder containing $CO_2$ or nitrogen. As one of skill in the art will appreciate, a valve and a regulator can be used to control the flow of pressure media at a desired pressure. Inflator 139 can be located on boat 141, as shown in FIG. 15. For onshore applications, inflator 139 can be located on a vehicle or on the ground. In embodiments, inflator 139 can be connected to a component of the containment apparatus. A pressurized cylinder, for example, can be mounted to a component such as, for example, an exterior surface of the oil spill container. The inflator 139, thou, can be above or below the surface of the sea, Inflation line 143 can communicate pressure media from inflator 139 to seal 127.

Accordingly, the disclosed embodiments provide numerous advantages over prior art embodiments. For example, the disclosed embodiments provide a device to contain fluid spills from a pipeline that is caused by a pinhole or rupture in a tubular wall of the pipeline. The pinhole or rupture can be caused by corrosion or external forces. The disclosed embodiments may be used on all pipes, such as those carrying hydrocarbon products, water, or gases. In addition, the disclosed embodiments may be used both on and offshore. Still further, the disclosed embodiments may be used on multiple pipeline diameter sizes, for example from a 1" diameter pipeline up to a 72" diameter pipeline with appropriate sizing of the component parts. The disclosed embodiments provide temporary containment, allowing depressurization of the pipeline for repair, and the disclosed embodiments may provide long-term isolation of the pipeline until the affected portion of the pipeline may be replaced.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A containment apparatus removably disposable around a pipe, the containment apparatus operable to contain substances passing through a tubular wall of the pipe from an interior of the pipe to an environment surrounding the pipe, the containment apparatus comprising:

a fluid container operable to be disposed around at least a portion of an outer diameter surface of the pipe such that the fluid container extends a longitudinal distance along an axis of the pipe;

a sealing apparatus comprising one or more seat members positioned along edges of the fluid container so that when the fluid container is positioned on the pipe, the seal members are operable to form a seal between the fluid container and an outer diameter surface of the pipe such that the substances passing through the tubular wall are controlled within the containment apparatus;

one or more pedestals disposable closely adjacent to the pipe, the pedestals having a length extending along the axis of the pipe and a height extending from a surface on which the pipe is disposed;

a plane bisecting the pipe, the laid container being disposable on the one or more pedestals so that at least a portion of the one or more seal members is closely co-planar with the plane;

column mounted to the fluid container to provide fluid communication from the fluid container, the column extending away from the outer diameter surface of the pipe;

wherein the fluid container comprises opposing ends, each end having a recess formed therein, the recesses each being operable to recieve a portion of the outer diameter surface of the pipe when the fluid container is disposed on the pedestals, the recesses each having a diameter substantially equal to the outer diameter of the pipe;

wherein the seal members extend along a longitudinal portion of the fluid container and along the recesses so that the seal members are disposed to provide a fluid cavity sealingly isolated from an area outside of the fluid container; and wherein the sealing apparatus provides a pressure media to the seal members to inflate the seal members into sealing contact with the pipe.

2. The containment apparatus of claim 1, wherein the pipe is positioned subsea aid a riser couples to the column and extends above a surface of the sea to provide fluid communication between the fluid cavity and a collecting compartment, the collecting compartment being accessible from the sea surface.

3. The containment apparatus, of claim 2, further comprising an isolation valve positioned in the riser to selectively allow fluid communication between the fluid cavity of the fluid container and the sea surface.

4. A containment apparatus removably disposable around a pipe, the containment apparatus operable to contain substances passing through a tubular wall of the pipe from an interior of the pipe to an environment surrounding the pipe, the containment apparatus comprising:

a fluid container operable to be disposed around at least a portion of an outer diameter surface of the pipe such that the fluid container extends a longitudinal distance along an axis of the pipe;

a sealing apparatus comprising one or more seal members positioned along edges of the fluid container so that when the fluid container is positioned on the pipe, the seal members are operable to form a seal between the fluid container and an outer diameter surface of the pipe such that the substances passing through the tubular wall are controlled within the containment apparatus;

the fluid container further comprises a lower portion pivotably mounted to a side of the fluid container so that the lower portion pivots along longitudinal edges parallel to the axis of the pipe, the lower portion including a bottom that extends from the lower portions to the outer diameter surface of the pipe when the lower portion is pivoted inward, the lower portion positioning the fluid container so that the fluid container surrounds the pipe;

the fluid container further comprises opposing ends, each end having a recess formed therein, the recesses melt being operable to receive a portion of the outer diameter surface of the pipe, at least a portion of the one or more seal members extending along a longitudinal portion of the bottom of the lower portion of the fluid container and along the recesses so that the seal members are disposed to provide a fluid cavity sealingly isolated from an area outside of the fluid container; and wherein the sealing apparatus provides a pressure media to the seal members to inflate the seal members into sealing contact with the pipe.

5. The containment apparatus of claim 4, wherein the pipe is positioned subsea and to riser is connected to a column and extends above a surface of the sea to a fluid container, the riser providing fluid communication between a fluid cavity of the fluid container and the sea surface.

6. The containment apparatus of claim 5, further comprising an isolation valve positioned in the riser to selectively allow fluid communication between the fluid cavity of the fluid container and the sea surface.

7. A containment apparatus removably disposable around a pipe to contain substances passing through a tubular wall of the pipe from an interior of the pipe to an environment surrounding the pipe, the containment apparatus comprising:

a fluid container having a portion disposable around at least a portion of an outer diameter surface of the pipe and extending a longitudinal distance along an axis of the pipe, the fluid container having opposing ends, each end having a recess formed therein, the recesses each being operable to receive a portion of the outer diameter surface of the pipe when the fluid container is disposed around at least a portion of the outer surface of the pipe, the recesses each having a diameter substantially equal to the outer diameter of the pipe;

a sealing apparatus comprising one or more seal members positioned along edges of the fluid container so that when the fluid container is disposed on the pipe, the seal members are operable to form a seal between the fluid container and the outer diameter surface of the pipe, the one or more seal members extending along the edges of each of a longitudinal portion of the fluid container and the recesses so that the sea members are disposed to provide a fluid cavity sealingly isolated from an area outside of the fluid container;

one or more pedestals disposable closely adjacent to the pipe, the pedestals having a length extending along the axis of the pipe and a height extending from a surface on which the pipe is disposed;

a plane bisecting the pipe, the fluid container being disposable on the one or more pedestals so that at least a portion of the one or more seal members is closely co-planar with the plane; and a column mounted to the fluid container to provide fluid communication from the fluid container, the column extending away from the outer diameter surface of the pipe.

8. The containment apparatus of claim 7, wherein the sealing apparatus further comprises an inflator in fluid communication with an interior of the one or more seal members, the sealing apparatus being actuable to energize the seal members into sealing contact with the outer diameter surface of the pipeline.

9. The containment apparatus of claim 7, wherein the pipe is positioned subsea and a riser couples to the column and extends above a surface of the sea to provide fluid communication between the fluid cavity of the fluid container and an upper portion of the column.

10. A. containment apparatus removably disposable around a pipe to contain substances passing through a tubular wall of the pipe from an interior of the pipe to an environment surrounding the pipe the containment apparatus comprising:
 a fluid container having a portion disposable around at least a portion of an outer diameter surface of the pipe and extending a longitudinal distance along an axis of the pipe, the fluid container having opposing ends and an recess formed in each end, each recess having a diameter substantially equal to the outer diameter of the pipe to receive a portion of the outer diameter surface of the pipe when the fluid container is disposed on the pipe;
 a sealing apparatus comprising one or more seal members mounted to one or more edges of the fluid container so that when the fluid container is disposed on the pipe, the seal members form a seal between the fluid container and the outer diameter surface of the pipe;
 a lower portion of the fluid container pivotably mounted to a side of the fluid container so that the lower portion may pivot along a longitudinal edge of the side parallel to the axis of the pipe, the lower portion including a bottom, the bottom extending to the outer diameter surface of the pipe when the lower portion is pivoted inward, the lower portion positioning the fluid container so that the fluid container surrounds the pipe, the seal members extending along a longitudinal portion of the bottom of the lower portion of the fluid container and along the recesses so that the seal members are disposed to provide a fluid cavity sealingly isolated from an area outside of the fluid container; and
 a column mounted to the fluid container to provide fluid communication from the fluid container, the column extending away from the outer diameter surface of the pipe.

11. The containment apparatus of claim 10, wherein sealing apparatus is actuable to energize the seal members into sealing contact with the outer diameter surface of the pipeline.

12. The containment apparatus of claim 11, wherein the sealing apparatus provides a pressure media to the seal members to inflate the seal members into sealing contact with the pipe.

13. The containment apparatus of claim 10 wherein the pipe is positioned subsea and a riser couples to the column and extends above a surface of the sea.

14. The containment apparatus of claim 13, further comprising an isolation valve positioned in the riser selectively allow fluid communication between the fluid cavity of the fluid container and an upper portion of the riser.

15. The containment apparatus of claim 10, wherein the lower portion of the fluid container is one of a pair of lower portions of the fluid container, each pivotably mounted to a side of the fluid container.

* * * * *

UNITED STATES PATENT AND TRADEMARK OFFICE
CERTIFICATE OF CORRECTION

| | | |
|---|---|---|
| PATENT NO. | : 9,004,813 B2 | Page 1 of 1 |
| APPLICATION NO. | : 13/772034 | |
| DATED | : April 14, 2015 | |
| INVENTOR(S) | : Al-Buralk | |

It is certified that error appears in the above-identified patent and that said Letters Patent is hereby corrected as shown below:

In the Claims

Column 17, Line 5, Claim 1, "seat" should read --seal--.

Column 17, Line 16, Claim 1, "laid" should read --fluid--.

Column 17, Line 20, Claim 1, "column" should read --a column--.

Column 17, Line 39, Claim 2, "aid" should read --and--.

Column 17, Line 44, Claim 3, "The containment apparatus, of claim 2, further comris" should read --The containment apparatus of claim 2, further comris--.

Column 18, Line 6, Claim 4, "melt" should read --each--.

Column 18, Line 18, Claim 5, "subsea and to riser" should read --subsea and a riser--.

Column 18, Line 47, Claim 7, "sea" should read --seal--.

Column 19, Line 6, Claim 10, "A." should read --A--.

Column 20, Line 23, Claim 14, "riser selectively" should read --riser to selectively--.

Signed and Sealed this
First Day of September, 2015

Michelle K. Lee
*Director of the United States Patent and Trademark Office*